United States Patent
Liu et al.

(10) Patent No.: US 11,422,275 B2
(45) Date of Patent: Aug. 23, 2022

(54) SYSTEM, METHOD AND COMPUTER PROGRAM PRODUCT FOR COMPRESSION OF SEISMIC DATA

(71) Applicant: King Fahd University of Petroleum and Minerals, Dhahran (SA)

(72) Inventors: Bo Liu, Dhahran (SA); Mohamed Mohandes, Dhahran (SA); Hilal Nuha, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 545 days.

(21) Appl. No.: 16/670,477

(22) Filed: Oct. 31, 2019

(65) Prior Publication Data
US 2021/0132245 A1 May 6, 2021

(51) Int. Cl.
| | | |
|---|---|---|
| G01V 1/24 | (2006.01) |
| G01V 1/28 | (2006.01) |
| G01V 1/00 | (2006.01) |
| G01V 1/18 | (2006.01) |

(52) U.S. Cl.
CPC ............ *G01V 1/24* (2013.01); *G01V 1/003* (2013.01); *G01V 1/18* (2013.01); *G01V 1/28* (2013.01); *G01V 2210/1212* (2013.01)

(58) Field of Classification Search
CPC . G01V 1/24; G01V 1/003; G01V 1/18; G01V 1/28; G01V 2210/1212; G01V 2210/40; G01V 2210/48; G01V 1/22; G01V 1/247
See application file for complete search history.

(56) References Cited

U.S. PATENT DOCUMENTS

| 3,252,130 A * | 5/1966 | Griffith | G06G 7/1921 |
|---|---|---|---|
| | | | 367/189 |
| 10,267,940 B2 * | 4/2019 | Nguyen | G01V 1/3808 |
| 2011/0141845 A1 | 6/2011 | Peacock et al. |
| 2014/0292549 A1 | 10/2014 | Liao et al. |
| 2014/0369166 A1 | 12/2014 | McDavid |
| 2015/0278284 A1 | 10/2015 | Bordignon et al. |
| 2016/0216389 A1 | 6/2016 | Hu |
| 2021/0132245 A1 * | 5/2021 | Liu | G01V 1/22 |

OTHER PUBLICATIONS

Sicking, et al. ; Distributed principal component analysis for data compression of sequential seismic sensor arrays ; Society of Exploration Geophysics ; 2016 ; 6 Pages.

* cited by examiner

*Primary Examiner* — Daniel Pihulic
(74) *Attorney, Agent, or Firm* — Oblon, McClelland, Maier & Neustadt, L.L.P.

(57) ABSTRACT

A system for seismic surveying, method for performing seismic and a non-transitory computer readable medium having instructions stored therein that, when executed by one or more processors, cause the one or more processors to perform a method for performing seismic surveying including emitting seismic waves into a substrate, receiving seismic waves reflected from discontinuities within the substrate, converting the seismic waves into seismic traces, and representing the seismic traces by superimposed multiple tone sinusoidal waves using a parameter estimation. An optimized residual of the modelling is compressed using entropy coding or quantization coding techniques, and the optimized residual and the parameter sets are transmitted to a remote processing station for reconstruction and analysis of the discontinuities.

20 Claims, 12 Drawing Sheets

SYSTEM, METHOD AND COMPUTER PROGRAM PRODUCT FOR COMPRESSION OF SEISMIC DATA

BACKGROUND OF THE INVENTION

Field of the Invention

This invention relates to an system for seismic surveying, a method for performing seismic surveying and a non-transitory computer readable medium having instructions stored therein that, when executed by one or more processors, cause the one or more processors to perform a method for performing seismic surveying.

Description of the Related Art

Seismic waves can be generated by many different sources and their reflections from geological boundaries are analyzed to determine characteristics of the structure through which the waves pass. Seismic waves are reflected from areas where a property, such as density or elasticity, of the geologic structure changes. The reflected waves are received by seismic receivers, which can take the form of geophones, hydrophones, acoustic sensors, seismometers, microphones, and any other device for receiving seismic or acoustic waves.

The seismic receivers may be one of a single receiver, a plurality of receivers in an array, or a plurality of receivers at known positions.

In a land based seismic survey, a possible seismic energy source could be a vibrator truck or dynamite on the ground surface as shown in FIG. 1A. The vibrator creates vibrations (shots) in the ground, which are referred to as seismic waves. The waves reflect from the discontinuities in the substrate and are received by a number of seismic receivers.

The receivers, such as geophones, are spaced out at regular intervals on the ground and receive the reflected seismic waves as shown in FIG. 1B.

Alternatively, the seismic energy source may be deployed under water. Marine seismic surveys typically employ a submerged seismic energy source towed by a ship and periodically activated to generate an acoustic wavefield (not shown). The seismic source generating the wavefield may be of any type, including a small explosive charge, an electric spark or arc, a marine vibrator or a gun. The seismic source gun may be a water gun, a vapor gun, and, most typically, an air gun. Typically, a marine seismic energy source consists not of a single source element, but of a spatially-distributed array of source elements.

Additionally, the seismic source may be generated by earthquakes, volcanic eruptions, nuclear explosions, or any geologic disturbance which produces acoustic waves (not shown).

In the embodiments of FIGS. 1A and 1B a single seismic wave producing incident is referred to as a "shot".

When the reflected wave data is received by the seismic receivers, such as an array of geophones, the data must be communicated to a processing station over a communications channel, such as a satellite communications channel, which might have a very limited bandwidth compared to the bandwidth needed to carry such high data rates, Therefore, it is desirable to represent the important features of the directional acoustic data in less than the full data rate, a process called compression.

During the last several decades, as the number of channels and the number of shots in modern seismic data acquisition have increased, the need for storage and transmission of seismic data has significantly increased. Modern seismic acquisitions usually deploy more than $10^4$ geophones for data recording. The reflection of a seismic energy shot is typically recorded by each geophone as a time series with a length of up to few seconds at a sampling period of few milliseconds, which leads to thousands of time samples per seismic trace. Therefore, reduction of the cost of both storage and transmission by compressing the seismic data volume has become imperative.

A variety of data compression methods are known. One of the most widely applied types of the compression methods uses the past values of a sequence to predict the current value and then encode the prediction error, or residual. This type is called a predictive coding scheme. See D. Salomon, *Data Compression: The Complete Reference*. Springer-Verlag London, 2007, incorporated herein by reference in its entirety. This type of scheme has been widely used in image compression, for example, Joint Photographic Experts Group (JPEG), and in time series compression, for example, Linear Predictive Compression (LPC). See G. K Wallace, "*The JPEG still picture compression standard,*" *Communications of the ACM*, vol. 34, pp. 31-44, 1991; and C. C. Cutler, "U.S. Pat. No. 2,605,361: Differential quantization for television signals," July 1952, each incorporated herein by reference in their entirety.

LPC data compression uses an autoregressive (AR) representation to represent discrete time series as $$\hat{x}(k) = \sum_{i=1}^{p} a_i x(k-i) \tag{23}$$

where p is the horizontal length of this linear representation and the ais are the coefficients, which are obtained by minimizing the following cost function J $$J = \sum_{k=p+1}^{N} \left[ x(k) - \sum_{i=1}^{p} a_i x(k-i) \right]^2. \tag{24}$$

The corresponding residual signal $$e_L(k) = x(k) - \hat{x}(k) \tag{25}$$

$$= x(k) - \sum_{i=1}^{p} a_i x(k-i), \tag{26}$$

has a lower entropy than x(k). The lossless LPC uses p coefficients $a_i$, the first p time samples x(1), x(2), ..., x(p), along with losslessly decoded residual samples eL(p+1), eL(p+2), ..., eL(N), to reconstruct the original signal x(k). To achieve a higher compression ratio, the residual samples have to be compressed in a lossy way. However, lossy compression of residual samples results in accumulation of the reconstruction error. Therefore, to avoid error accumulation in practice, the compressor emulates the reconstruction procedure of the decompressor to calculate the residual from the estimates of the reconstructed samples:

$$\hat{x}'(k) = \sum_{i=1}^{p} a_i x_r(k-i) \qquad (27)$$

where xr(k) denotes the reconstructed sample of x(k). Then the residual samples are calculated as in (25). The quantization of residual is given as $$Q[e'_L(k)] = e'_L(k) + q(k) \qquad (28)$$

where $Q[e'_L(k)]$ means quantization and q(k) is quantization error. Thus the sample is reconstructed as $$x_r(k) = \hat{x}(k) + Q[e'_L(k)] \qquad (29)$$
$$= x(k) + q(k). \qquad (30)$$

This scheme is called differential pulse code modulation (DPCM). Although $x_r(k)$ appears not to have any accumulated error, this procedure is still risky. First, coefficients $a_i$s are optimal for $\hat{x}(k)$ as in (23) instead of $\hat{x}'(k)$ as in (27). The predictive error is expected to be larger. Secondly, quantizor Q is designed based on the distribution of $e_L(k)$, instead of $e'_L(k)$. The predictive error is expected to be larger. Secondly, quantizor Q is designed based on the distribution of $e_L(k)$, instead of $e'_L(k)$. The quantization error is also expected to be larger. Those predictive and quantization errors are accumulated in the reconstruction and therefore the decompressed signal may largely diverge.

The present disclosure seeks to overcome the disadvantages of prior art seismic surveying by providing a complete system including seismic wave generation, reflected wave reception, processing and compression of the waves for transmission and transmitting compressed parameters to a remote processing station. Further, the compression method of the present disclosure offers a flexible and robust compression-decompression scheme as compared with LPC, as the signal can be reconstructed using only estimates of representation parameters with low risk of reconstruction divergence. A high compression rate is achieved and the reconstruction ratio and quality can be scaled by adjusting the number of representation components and the level of quantization.

The foregoing "Background" description is for the purpose of generally presenting the context of the disclosure. Work of the inventors, to the extent it is described in this background section, as well as aspects of the description which may not otherwise qualify as prior art at the time of filing, are neither expressly or impliedly admitted as prior art against the present invention.

SUMMARY OF THE INVENTION

The invention discloses an describes a system for seismic surveying, a method for performing seismic surveying and a non-transitory computer readable medium having instructions stored therein that, when executed by one or more processors, cause the one or more processors to perform a method for seismic surveying. The received seismic waves are represented as multiple tone sinusoidal waves in order to develop parameter sets and an optimized residual, which are compressed and transmitted to a remote computing station for reconstruction and analysis.

An exemplary system for seismic surveying is described. The system comprises at least one seismic generator for emitting seismic shot waves into a geological formation; at least one seismic receiver for receiving waves reflected from discontinuities within the geological formation; a computer interface coupled to the at least one seismic receiver for receiving the reflected waves; the computer interface separating the received reflected waves into seismic traces, each seismic trace representing a number (N) of samples collected over a time period; a computing system adapted to receive the seismic traces from the computer interface; wherein the computing system comprises: a processor with circuitry configured to represent the at least one trace by determining a set of decaying sinusoids ($s_k$) which when superimposed represent the seismic trace to within a residual energy criterion, wherein each of the decaying sinusoids is characterized by a set of parameters including a starting time parameter ($k_i$), a damping factor parameter ($h_i$), a frequency parameter ($\omega_i$), at least one amplitude parameter ($A_i, B_i$) and a constant shift parameter ($C_i$); and a memory module for storing the set of parameters.

In a second embodiment, a method for seismic surveying is described. The method includes emitting, using at least one seismic generator, seismic shot waves into a geological formation; receiving, using at least one seismic receiver, waves reflected from discontinuities within the geological formation; receiving, at a computer interface coupled to the at least one seismic receiver, the reflected waves and separating the received reflected waves into seismic traces, each seismic trace representing a number (N) of samples collected over a time period; receiving, by a computing system, the seismic traces from the computer interface, wherein the computing system comprises a processor with circuitry configured for representing the at least one trace by determining a set of decaying sinusoids ($s_k$) which when superimposed, represent the seismic trace to within a residual energy criterion, wherein each of the decaying sinusoids is characterized by a set of parameters including a starting time parameter ($k_i$), a damping factor parameter ($h_i$), a frequency parameter ($\omega_i$), at least one amplitude parameter ($A_i, B_i$) and a constant shift parameter ($C_i$); and storing the set of parameters in a memory module.

In both the system and method embodiments, the computing system further optimizes the residual by iterating the steps until a residual energy criterion is met. The residual energy is compressed and the compressed residual energy and the parameter sets are transmitted to a remote processing station, as will be described in detail below.

In a further embodiment, a non-transitory computer readable medium having instructions stored therein that, when executed by one or more processor, causes the one or more processors to perform a method of seismic surveying is described. The method comprises emitting, using at least one seismic generator, seismic shot waves into a geological formation; receiving, using at least one seismic receiver, waves reflected from discontinuities within the geological formation; receiving, at a computer interface coupled to the at least one seismic receiver, the reflected waves and separating the received reflected waves into seismic traces, each seismic trace representing a number (N) of samples collected over a time period; receiving, by a computing system, the seismic traces from the computer interface, wherein the computing system comprises a processor with circuitry configured for ; representing the at least one trace by determining a set of decaying sinusoids ($s_k$) which when superimposed represent the seismic trace to within a residual energy criterion, wherein each of the decaying sinusoids is characterized by a set of parameters including a starting time parameter ($k_i$), a damping factor parameter ($h_i$), a frequency parameter ($\omega_i$), at least one amplitude parameter ($A_i, B_i$) and a constant shift parameter ($C_i$); reconstructing the seismic trace from the set of parameters; determining a residual between the seismic trace and the reconstructed seismic trace; determining whether the residual meets a residual energy criterion; determining a new set of parameters based upon the set of parameters, wherein the new set of parameters characterize a new set of decaying sinusoids; reconstructing the seismic trace from the new set of parameters; determining a new residual between the seismic trace and the reconstructed seismic trace from the new set of parameters; determining whether the new residual meets a pre-defined residual energy criterion; reiterating the determining of the residual and the determining of a set of parameters based upon the previously determined set of parameters until the residual meets the pre-defined residual energy criterion; compressing, using a compression module, the residual that meets the pre-defined residual energy criterion using entropy coding or quantization coding; storing the encoded residual with the sets of parameters; and transmitting the stored encoded residual energy and set of parameters to a remote processing station.

The seismic generator may emit shots directly into the ground, or may emit shots into an underwater environment, in order to penetrate the surface below the water. In either case, the seismic generator is preferably at least one of a vibrator on a vibrator truck, an explosive device, an air gun, a water gun, a vapor gun, an electric spark, an electric arc and a marine vibrator.

The seismic receiver is preferably at least one of a geophone, a hydrophone, a seismometer, a microphone, a particle velocity sensor, a water pressure sensor, a particle displacement sensor, a particle acceleration sensor and a pressure gradient sensor. The seismic receiver may be a single receiver, a plurality of receivers or an array of receivers.

In various aspects, an apparatus or logic encoded in tangible media or computer-readable media is configured to cause the apparatus to perform one or more steps of the above methods and systems.

The advantages of the proposed invention are that a seismic trace is represented using a small number of parameters, therefore leading to a very high compression ratio, and that the reconstruction quality and compression ratio can be scaled by adjusting the number of representation components. This improvement reduces the cost of both storage and transmission of the seismic data.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1A:
FIG. 1A illustrates a ground based seismic energy shot source;.

Referring now to the drawings, wherein like reference numerals designate identical or corresponding parts throughout the several views.

Embodiments to a system for seismic surveying, a method for seismic surveying and a non-transitory computer readable medium having instructions stored therein that, when executed by one or more processor, cause the one or more processors to perform a method of seismic surveying are now described.

Figure 1B:
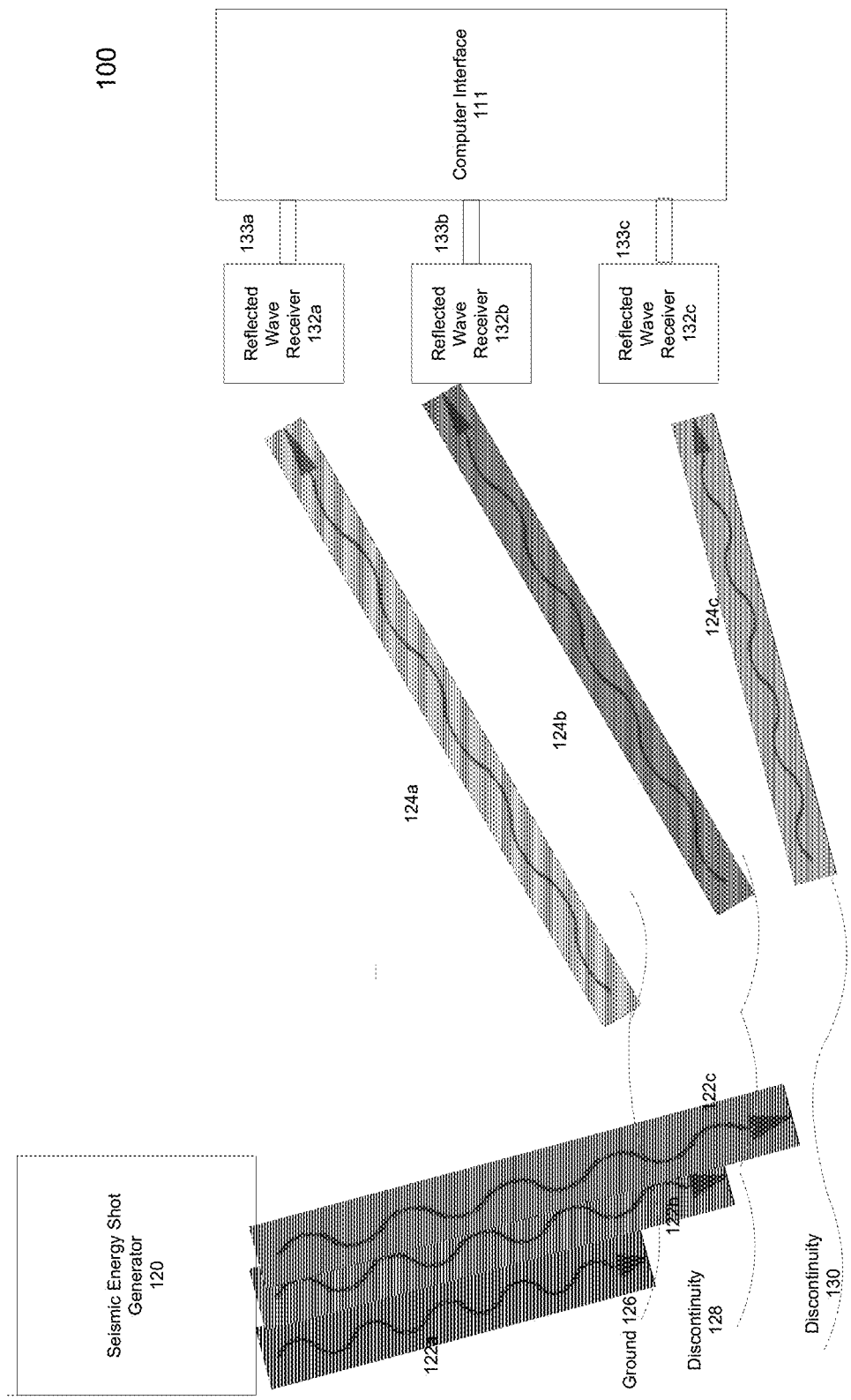
FIG. 1B illustrates a system for generating seismic waves, receiving the reflected waves and coupling the seismic waves to a computer interface.
Figure 2:
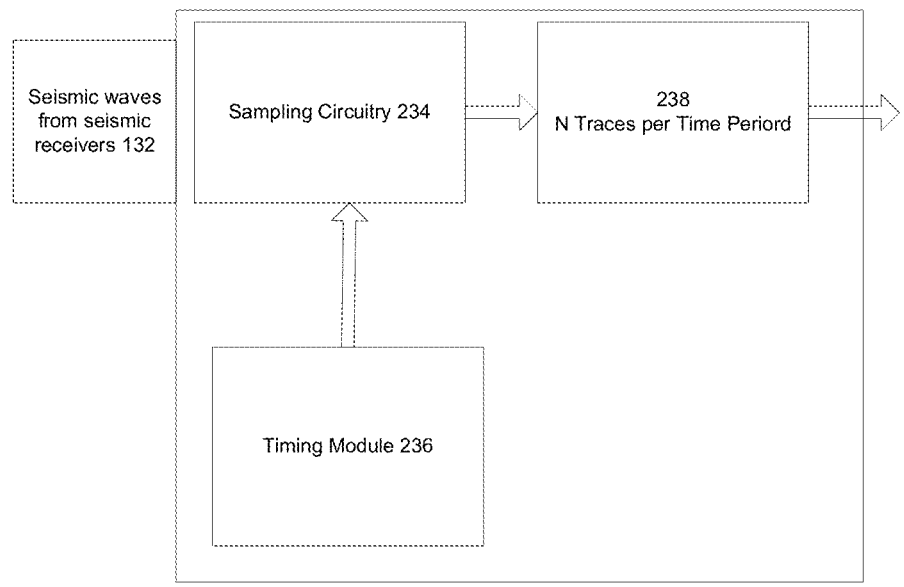
FIG. 2 illustrates a computer interface adapted to receive the waves from the seismic receivers and convert the waves into N traces each of sampling time T.

In one aspect, the generation and reception of signals for seismic acquisition is accomplished by applying a source of energy, which is shown in one aspect as generated by a vibrator 120 carried by a vibrator truck as shown in FIG. 1A. Each vibration is referred to as a shot. FIG. 1B illustrates a seismic energy shot generator 120 emitting shot waves 122a, 122b and 122c into a ground surface 126. The shot waves are reflected from the ground surface 126 and discontinuities 128 and 130 to generate reflected waves 124a, 124b and 124c. Reflected waves 124a, 124b and 124c are received by a seismic receivers 132a, 132b and 132c (geophones, for example) spaced at regular intervals on the ground. In a second aspect (not shown) acoustic shot waves are emitted into either the surface of or within a body of water by an acoustic shot source (an acoustic gun, for example). Reflected waves representing the discontinuities in the underlying surface are received by at least one hydrophone, acoustic geophone, or other acoustic receiver.

The seismic generator is preferably at least one of a vibrator on a vibrator truck, an explosive device, an air gun, a water gun and a vapor gun, The seismic receiver is preferably at least one of a geophone, a hydrophone, a seismometer, a microphone, a particle velocity sensor, a water pressure sensor, a particle displacement sensor, a particle acceleration sensor and a pressure gradient sensor Although FIG. 1B shows only three waves and three receivers for clarity, an actual survey site may have a plurality of shot generators and many hundreds of seismic receivers.

Although not shown in FIG. 1B, each seismic shot furcates into a number of waves, which are reflected from discontinuities in the geologic structure. In all instances, the reflected waves have different paths, frequencies and arriving times.

The seismic receivers are coupled to a computer interface 111. As shown in FIG. 1B, the reflected waves from the seismic receivers are received by computer interface 111.

Within the computer interface 111 is a timing module 236, having circuitry configured to provide a time period (T) for sampling the reflected waves. The seismic waves are sampled by the Sampling Circuitry 234 during the time period, thus generating seismic traces, each trace representing a number (N) of samples collected over a time period (T).

Figure 3:
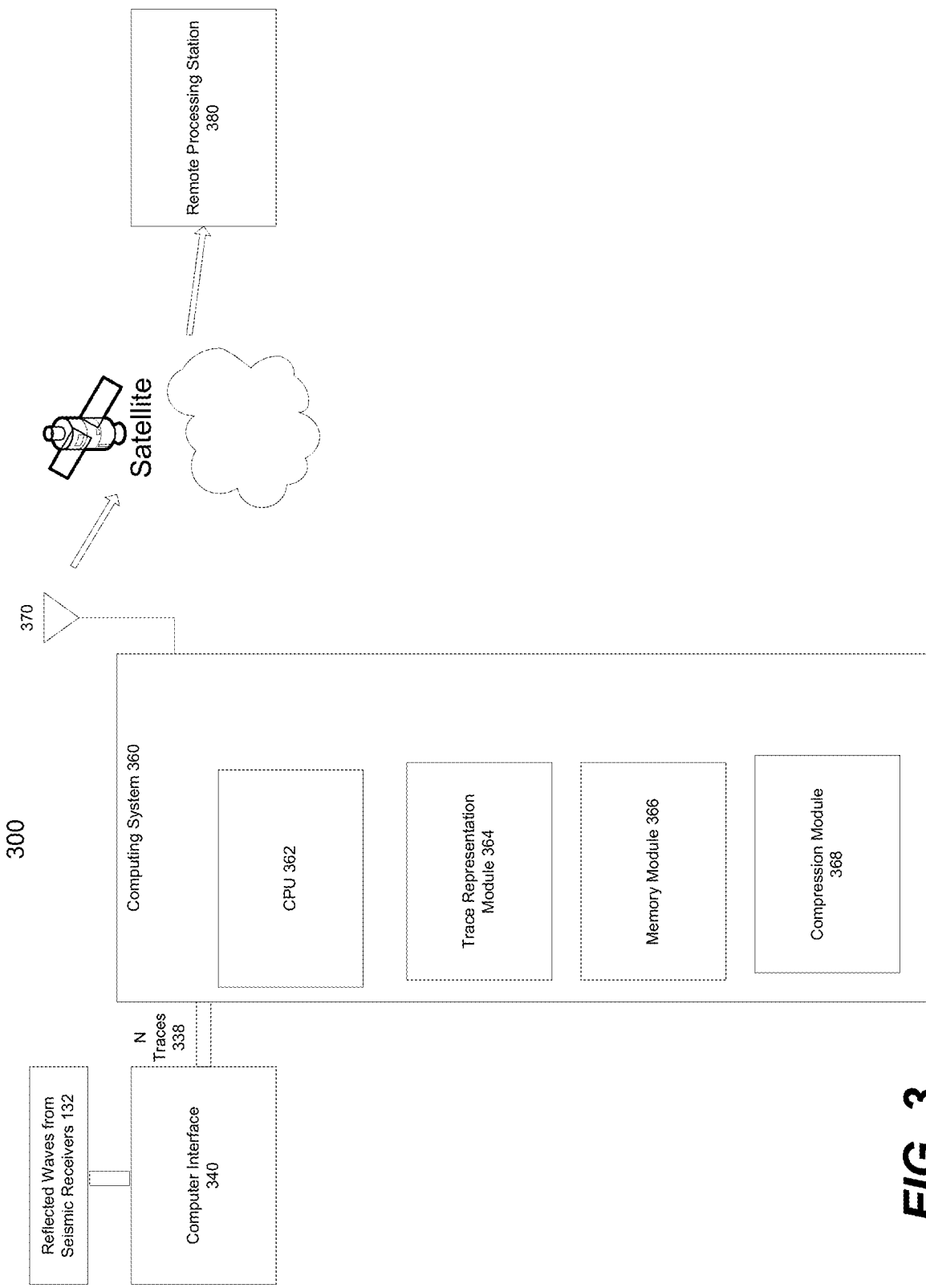
FIG. 3 depicts an overview of the system from reception of the reflected seismic waves through transmission to a remote processing station.

FIG. 3 is an overview of the invention, in which the seismic receivers 132 are coupled to Computer Interface 340. The Computer Interface 340 has circuitry which separates the signals into N traces each of sampling time period (T) and sends the N traces 338 to Computing System 360. Computing System 360 includes circuitry configured to create a representation of the N traces in a Trace Representation Module 364, and the results are compressed in the Compression Module 368. The compressed results are then transmitted to remote processing station 380 for reconstruction and analysis. While FIG. 3 describes an embodiment in which the compressed results are transmitted wirelessly to the remote processing station through the cloud or via satellite, other transmission modes may be used including land line or transmission through hard storage devices.

Figure 4:
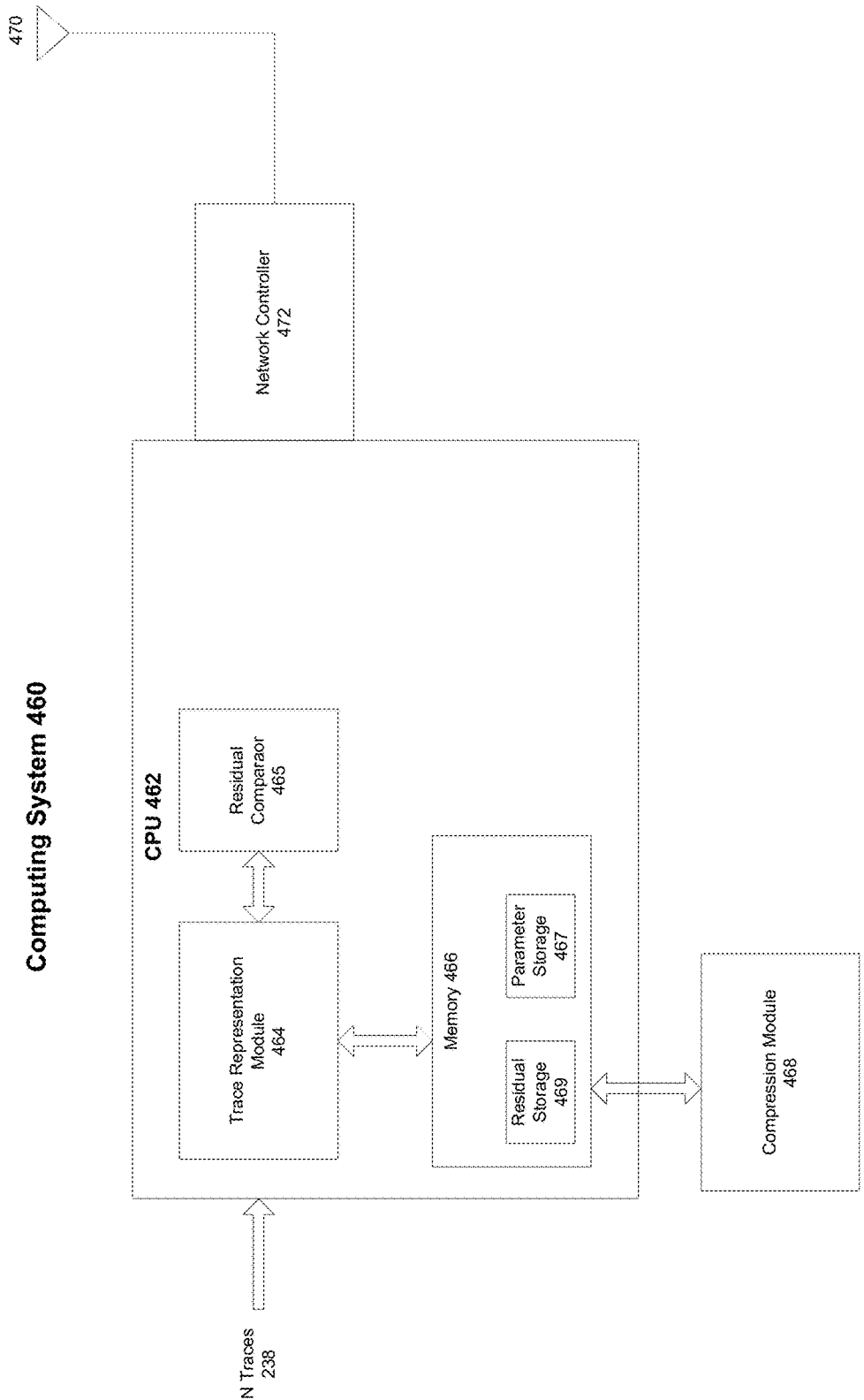
FIG. 4 illustrates a computer system modified to process, represent, compress and transmit the wave traces of FIG. 2.

FIG. 4 shows the Computing System 460 in more detail. The Computing System 460 receives the N seismic traces from the computer interface. Computing System 460 includes a processor (CPU 462) having a Trace Representation module 464 adapted to represent the at least one trace by determining a set of decaying sinusoids ($s_k$) which when superimposed represent the seismic trace to within a residual energy criterion, wherein each of the decaying sinusoids is characterized by a set of parameters including a starting time parameter ($k_i$), a damping factor parameter ($h_i$), a frequency parameter ($\omega_i$), at least one amplitude parameter ($A_i$, $B_i$) and a constant shift parameter ($C_i$). The Computing System 460 also includes a Memory Module 466 for storing the set of parameters at Parameter Storage 467, as well as enabling other memory functions of the CPU 462.

In further detail, the processor 462 reconstructs the seismic trace from the set of stored parameters; determines a residual between the seismic trace and the reconstructed seismic trace; determines whether the residual meets a residual energy criterion at Residual Comparator 465; based upon the set of stored parameters, determines a new set of parameters that characterize a new set of decaying sinusoids; stores the new set of parameters in Parameter Storage 467; reconstructs the seismic trace from the new set of stored parameters; determines a new residual between the seismic trace and the reconstructed seismic trace from the new set of parameters; determines whether the new residual meets a pre-defined residual energy criterion at Residual Comparator 365; reiterates the determining of the residual and the determining of a set of parameters based upon the previously determined set of parameters until the residual meets the pre-defined residual energy criterion; and stores the sets of parameters at Parameter Storage 467 determined at each iteration with the residual which meets pre-defined residual energy criterion (stored at Residual Storage 469).

A method for seismic surveying is now described with respect to FIGS. 1-4. The method includes emitting, using at least one seismic generator, seismic shot waves into a geological formation as shown in FIG. 1A or into a body of water as described with respect to underwater surveying (not shown). The method includes receiving, by using at least one seismic receiver (132a, 132b, 132c), reflected waves which represent discontinuities within the geological formation; receiving the received reflected waves at a computer interface 111 coupled to the at least one seismic receiver (132a, 132b, 132c), and separating the received reflected waves into N seismic traces 238, each seismic trace 238 representing a number (N) of samples collected over a time period.

The seismic traces are sent to computing system 460, wherein the computing system 460 comprises a processing module 462 adapted to create a representation of the seismic traces. The computing system 460 performs the method of representing the at least one trace by determining a set of decaying sinusoids ($s_k$) which when superimposed represent the seismic trace to within a residual energy criterion, wherein each of the decaying sinusoids is characterized by a set of parameters including a starting time parameter ($k_i$), a damping factor parameter ($h_i$), a frequency parameter ($\omega_i$), at least one amplitude parameter ($A_i$, $B_i$) and a constant shift parameter ($C_i$); and storing the set of parameters in Parameter Storage 467 in Memory Module 466.

The method further comprises the Trace Representation Module 464 of the processor reconstructing the seismic trace from the set of stored parameters; determining a residual between the seismic trace and the reconstructed seismic trace; determining whether the residual meets a residual energy criterion at Residual Comparator 465; determining a new set of parameters based upon the set of stored parameters, wherein the new set of parameters characterize a new set of decaying sinusoids; storing the new set of parameters in Parameter Storage 467 of Memory Module 466; reconstructing the seismic trace from the new set of stored parameters; determining a new residual between the seismic trace and the reconstructed seismic trace from the new set of parameters; determining whether the new residual meets a pre-defined residual energy criterion at Residual Comparator 465; reiterating the determining of the residual and the determining of a set of parameters based upon the previously determined set of parameters until the residual meets the pre-defined residual energy criterion; and storing, in Parameter Storage 467 of Memory Module 466 and Residual Storage 467, the sets of parameters determined at each iteration with the residual which meet the pre-defined residual energy criterion.

In both the system and method embodiments, a compression module 468 compresses the residual that meets the pre-defined residual energy criterion using entropy coding or quantization coding; and stores the encoded residual along with the sets of parameters in Memory Module 466 within Residual Storage 469 and Parameter Storage 467 respectively. The stored encoded residual energy and the stored set of parameters are sent to Network Controller 472 and antenna 470 and transmitted to remote processing station 360.

A further embodiment to a non-transitory computer readable medium having instructions stored therein that, when executed by one or more processor, cause the one or more processors to perform a method of seismic surveying, is now described with respect to FIGS. 1-4.

The performance of the method of seismic surveying includes emitting, using at least one seismic generator, seismic shot waves into the substrate of the ground at a location as shown in FIG. 1A or as described with respect to underwater surveying (not shown). Receiving, by using at least one seismic receiver (132a, 132b, 132c), reflected waves which represent discontinuities within the substrate; receiving the reflected waves at a computer interface 111 coupled to the at least one seismic receiver (132a, 132b, 132c), and separating the received reflected waves into N seismic traces 238, each seismic trace 238 representing a number (N) of samples collected over a time period (T).

The seismic traces are sent to computing system 460, wherein the computing system 460 comprises a processor 462 adapted to create a representation of the seismic traces. The computing system 460 performs the method of representing the at least one trace by determining a set of decaying sinusoids ($s_k$) which when superimposed represent the seismic trace to within a residual energy criterion, wherein each of the decaying sinusoids is characterized by a set of parameters including a starting time parameter ($k_i$), a damping factor parameter ($h_i$), a frequency parameter ($\omega_i$), at least one amplitude parameter ($A_i$, Bi) and a constant shift parameter ($C_i$); and storing the set of parameters in Parameter Storage 467 in Memory Module 466.

The performance of the method further comprises Trace Representation Module 464 of the processor reconstructing the seismic trace from the set of stored parameters; determining a residual between the seismic trace and the reconstructed seismic trace; determining whether the residual meets a residual energy criterion at Residual Comparator 465; determining a new set of parameters based upon the set of stored parameters, wherein the new set of parameters characterize a new set of decaying sinusoids; storing the new set of parameters in Parameter Storage 467 of Memory Module 466; reconstructing the seismic trace from the new set of stored parameters; determining a new residual between the seismic trace and the reconstructed seismic trace from the new set of parameters; determining whether the new residual meets a pre-defined residual energy criterion at Residual Comparator 465; reiterating the determining of the residual and the determining of a set of parameters based upon the previously determined set of parameters until the residual meets the pre-defined residual energy criterion; and storing, in Parameter Storage 467 of memory module 466 and Residual Storage 467, the sets of parameters determined at each iteration with the residual which meet the pre-defined residual energy criterion. The method further includes compressing, using a compression module 468, the residual that meets the pre-defined residual energy criterion using entropy coding or quantization coding; and storing the encoded residual with the sets of parameters within Residual Storage 469 and Parameter Storage 467 respectively; and transmitting, using Network Controller 472 and antenna 470, the stored encoded residual energy and the stored set of parameters to remote processing station 360.

The trace representation executed by the processor for the system, the method and the non-transitory computer readable medium is now described in more detail. In order to emulate the nature of seismic wave propagation, a seismic trace, x(k), with N time samples is represented as a superposition of a number of exponentially decaying sinusoidal waves as:

$$x(k) = \sum_{i=1}^{M} s_{\theta_i}(k) + v(k), k = 1, 2, \ldots, N \quad (1)$$

where v(k) denotes the unrepresented signal, and $s_{\theta_i}(k)$ are exponentially decaying sinusoidal waves defined as $$s_{\theta_i}(k) = \begin{cases} e^{-h_i(k-k_i)T}\alpha_i \sin(\omega_i(k-k_i)T + \phi_i) + C_i & k \geq k_i \\ 0 & k < k_i \end{cases} \quad (2)$$

where T is the sampling time of the seismic trace and $h_i$, $k_i$, $\alpha_i$, $\omega_i$, $\phi_i$ and $C_i$ are: damping factor, starting time, initial amplitude, frequency, phase shift and constant shift, respectively. The decaying sinusoidal waves $s_{\theta_i}(k)$ could be recast, for $k \geq k_i$, into the following form:

$$s_{\theta_i}(k) = e^{-h_i(k-k_i)T}A_i \cos \omega_i(k-k_i)T + e^{-h_i(k-k_i)T}B_i \sin \omega_i(k-k_i)T + C_i, \quad (3)$$

where $A_i = \alpha_i \sin \phi_i$ and $B_i = \alpha_i \cos \phi_i$. Define the parameter set for each sinusoidal wave as $\theta_i = \{k_i, \pi_i\}$ and $\pi_i = \{A_i, B_i, C_i, \omega_i, h_i\}$, then the parameters of all sinusoidal waves are defined as $\Theta = \{\theta_1, \theta_2, \ldots, \theta_M\}$.

First of all, parameter estimation is considered for a single tone sinusoidal representation case, i.e. representation (1) with M=1, $\theta = \{ks, \pi\}$, and $\pi = \{A, B, C, \omega, h\}$ for $k \geq ks$:

$$x(k) = e^{-h(k-k_s)T}A \cos \omega(k-k_s)T + e^{-h(k-k_s)T}B \sin \omega(k-k_s)T + C. \quad (4)$$

Approximate continuous time functions $e^{-ht} \cos \omega t$ and $e^{-ht} \sin \omega t$ by using the first order Taylor series at $h=\hat{h}$ and $\omega=\hat{\omega}$ as $$e^{-ht} \cos \omega t \approx e^{-\hat{h}t} \cos \hat{\omega}t - te^{-\hat{h}t} \sin \hat{\omega} \cdot \nabla\hat{\omega} - te^{-\hat{h}t} \cos \hat{\omega}t \cdot \nabla \hat{h} \quad (5)$$

$$e^{-ht} \sin \omega t \approx e^{-\hat{h}t} \sin \hat{\omega}t + te^{-\hat{h}} \cos \hat{\omega} \cdot \nabla\hat{\omega} - te^{-\hat{h}t} \cos \hat{\omega}t \cdot \nabla \hat{h} \quad (6)$$

where $\nabla\hat{\omega} = \omega - \hat{\omega}$ and $\nabla\hat{h} = h - \hat{h}$. Then a continuous time decaying sinusoidal wave, $$s_\theta(t) = e^{-ht}A \cos \omega t + e^{-ht}B \sin \omega t + C, \quad (7)$$

is approximated using (5) and (6) as follows, $$s_\theta(t) \approx Ae^{-\hat{h}t}\cos\hat{\omega}t - Ate^{-\hat{h}t}\sin\hat{\omega} \cdot \nabla \hat{\omega} - Ate^{-\hat{h}t}\cos\hat{\omega}t \cdot \nabla \hat{h} + Be^{-\hat{h}t}\sin\hat{\omega}t + Bte^{-\hat{h}t}\cos\hat{\omega} \cdot \nabla \hat{\omega} - Bte^{-\hat{h}t}\sin\hat{\omega}t \cdot \nabla \hat{h} + C \quad (8)$$

$$= Ae^{-\hat{h}t}\cos\hat{\omega}t + Be^{-\hat{h}t}\sin\hat{\omega}t - \left(Ate^{-\hat{h}t}\sin\hat{\omega} - Bte^{-\hat{h}t}\cos\hat{\omega}\right)\nabla \hat{\omega} - \left(Ate^{-\hat{h}t}\cos\hat{\omega}t + Bte^{-\hat{h}t}\sin\hat{\omega}t\right)\nabla \hat{h} + C \quad (9)$$

Assume that the starting time instant of this single tone sinusoidal wave is k. Define parameter vector [A B C $\nabla\hat{\omega}$ $\nabla\hat{h}]^T$, data vector x(k)=[x(k) x(k+1) ... x(N)]T, $t_j$=jT and matrix $$D(A, B, \hat{\omega}, \hat{h}) = [P(\hat{\omega}, \hat{h}) \quad Q(A, B, \hat{\omega}, \hat{h})] \quad (10)$$

where $$P(\hat{\omega}, \hat{h}) = \begin{bmatrix} e^{-\hat{h}t_1}\cos\hat{\omega}t_1 & e^{-\hat{h}t_1}\sin\hat{\omega}t_1 & 1 \\ e^{-\hat{h}t_2}\cos\hat{\omega}t_2 & e^{-\hat{h}t_2}\sin\hat{\omega}t_2 & 1 \\ \vdots & \vdots & \vdots \\ e^{-\hat{h}t_N}\cos\hat{\omega}t_N & e^{-\hat{h}t_N}\sin\hat{\omega}t_N & 1 \end{bmatrix} \quad (11)$$

$$Q(A, B, \hat{\omega}, \hat{h}) = \begin{bmatrix} -At_1 e^{-\hat{h}t}\sin\hat{\omega}+ & -At_1 e^{-\hat{h}t_1}\cos\hat{\omega}t_1 - \\ Bt_1 e^{-\hat{h}t_1}\cos\hat{\omega} & Bt_1 e^{-\hat{h}t_1}\sin\hat{\omega}t_1 \\ -At_2 e^{-\hat{h}t}\sin\hat{\omega}+ & -At_2 e^{-\hat{h}t_1}\cos\hat{\omega}t_2 - \\ Bt_2 e^{-\hat{h}t_1}\cos\hat{\omega} & Bt_2 e^{-\hat{h}t_1}\sin\hat{\omega}t_2 \\ \vdots & \vdots \\ -At_N e^{-\hat{h}t_N}\sin\hat{\omega}+ & -At_N e^{-\hat{h}t_N}\sin\hat{\omega}t_N - \\ Bt_N e^{-\hat{h}t_N}\cos\hat{\omega} & Bt_N e^{-\hat{h}t_N}\cos\hat{\omega}_N \end{bmatrix}$$

This provides a first order approximation of data as $$x(k) = D(A, B, \hat{\omega}, \hat{h})z. \quad (12)$$

This nonlinear optimization can be solved by the following steps. First, initialize $\theta$ to the parameter vector $z^{(0)}=[\hat{A}^{(0)}, \hat{B}^{(0)}, \hat{C}^{(0)}, \nabla\hat{\omega}^{(0)}=0, \nabla\hat{h}^{(0)}=0]^T$. Secondly, at each iteration, update the estimates of $\hat{\omega}^{(i)}=\hat{\omega}^{(i-1)}+\nabla\hat{\omega}^{(i-1)}$, $\hat{h}^{(i)}=\hat{h}^{(i-1)}+\nabla\hat{h}^{(i-1)}$, and create $D_i=\hat{D}(\hat{A}^{(i-1)}\hat{B}^{(i-1)}\hat{\omega}^{(i)}\hat{h}^{(i)})$, then (12) is linearized. Last, solve the parameter estimation vector from the linearized optimization $z^{(i)}=(D_i^T D_i)^{-1}D_i^T$. These steps are repeated until the estimate of parameter $\pi=\{A, B, C, \omega, h\}$ converges. The steps are summarized in TABLE 1.

TABLE 1

Parameter Estimation for the Single Tone Case

| Step | Operation |
|---|---|
| a) | $z^{(0)} = [\hat{A}^{(0)}, \hat{B}^{(0)}, \hat{C}^{(0)}, \nabla\hat{\omega}^{(0)} = 0, \nabla\hat{h}^{(0)} = 0]^T, \hat{w}^{(0)}, \hat{h}^{(0)}$, i = 0 |
| b) | Next iteration i = i + 1 |
| c) | $\hat{\omega}^{(i)} = \hat{\omega}^{(i-1)} + \nabla\hat{\omega}^{(i-1)}, \hat{h}^{(i)} = \hat{h}^{(i-1)} + \nabla\hat{h}^{(i-1)}$ |
| d) | Generate $D_i = \hat{D}(\hat{A}^{(i-1)} \hat{B}^{(i-1)} \hat{\omega}^{(i)} \hat{h}^{(i)})$ |
| e) | Solve $z^{(i)} = (D_i^T D_i)^{-1} D_i^T y^T$ |
| f) | Repeat steps b)-e) until convergence |

For each postulated starting time instant k, a corresponding parameter set $\pi(k)$ can be solved as mentioned above by applying the proposed steps in TABLE 1 to nonlinear optimization (12), hence a corresponding reconstruction error is obtained as $$e(k, \pi(k)) = \sum_{j=1}^{N}(x(j) - \hat{x}_k(j))^2, \quad (13)$$

where signal $\hat{x}_k(j)$ denotes the reconstructed seismic trace as in (4) with a postulated starting time k and the corresponding parameter estimate $\pi(k)$.

In this work, the starting time $k_s$ is estimated as $$\hat{k}_s = \arg_k \min e(k, \pi(k)). \quad (14)$$

Optimization (14) can be solved either in an exhaustive way, i.e., to solve reconstruction error $e(k, \pi(k))$ for all possible time instants, then choose the minimum one, or in an iterative grid searching way. Note that a too large postulated starting time k results in a short data vector y(k), consequently leading to a convergence problem.

Secondly, the single-tone parameter estimation scheme is extended to the multiple-tone case. The suitable number of decaying sinusoidal waves, M, should be tuned as a tradeoff between number of parameters and the accuracy of the representation. However, the value of M cannot be determined in advance. A sequential way to estimate the parameters of the multiple-tone representation (1) without pre-determining the value of M is introduced as follows $$\theta_i^* = \arg_{\theta_i} \min \sum_{k=1}^{N}\left[x(k) - \sum_{j=1}^{i-1}s_{\theta_j^*}(k) - s_{\theta_i}(k)\right]^2. \quad (15)$$

where $\theta_i^*$ denotes the optimal estimate of $\theta_i$, which relies on the optimal estimates of the previous i–1 parameter sets $\theta_1^*, \theta_2^*, \ldots, \theta_{i-1}^*$.

This calculation can be implemented on a given seismic trace x(k) as in the following steps. First, assume that the seismic trace is represented by only one decaying sinusoidal wave (M=1) as in (1). Then, apply the single-tone estimation method developed in the previous section to x(k) and obtain the first parameter estimate set $\theta_1^*$. The signal residual up to this step is given as $$r_{\theta_1}^*(k) = x(k) - s_{\theta_1}^*(k) \quad (16)$$

Its signal energy is denoted by $r_{\theta_1}^{*2}$. Next, implement the single-tone estimation method on $r_{\theta_1}^*(k)$ to obtain the parameter estimate $\theta_2^*$ and the second residual signal $r_{\theta_2}^*(k)$ similarly. This procedure is repeated and the parameter sets are estimated component by component. At the ith iteration, the parameters of representation $s_{\theta_i}(k)$ are estimated from previous residual signal $r_{\theta_{i-1}}^*(k)$, leading to the next residual as follows:

$$r_{\theta_i^*}(k) = x(k) - \sum_{j=i}^{i}s_{\theta_j^*}(k). \quad (17)$$

The process is terminated once the residual energy is lower than a predefined threshold $r_D$, i.e.

$$r_{\theta_j}^{*2} < r_E, \quad (18)$$

Alternatively the process can be terminated once the residual energy dropping rate is lower than a predefined threshold $r_D$, i.e., $$\frac{r_{\theta_{j-1}^*}^2 - r_{\theta_j^*}^2}{r_{\theta_{j-1}^*}^2}100\% < r_D, \quad (19)$$

These steps are summarized in TABLE 2.

TABLE 2

Parameter Estimation for the Multiple Tone Case

| Step | Operation |
|---|---|
| a) | Estimate $\theta_1^*$ from trace x[k] by implementing Algorithm I; |
| b) | Calculate residual $r_{\theta_1^*}[k]$ as in (16); |
| c) | Next iteration i = i + 1 |
| c) | Estimate $\theta_1^*$ from residual signal $r_{\theta_{i-1}^*}[k]$ by implementing Algorithm I; |
| d) | Calculate residual $r_{\theta_1^*}[k]$ as in (17); |
| e) | If criteria (18) or (19) satisfies, then terminate, else go back to step c) |

The data volume of K original seismic traces in L-bit data format is V=NKL. Suppose that representing each trace with M representation components squeezes the signal variance to $\sigma_{cp}^2$, which is smaller than the variance of the original traces, then entropy coding of those residuals along with the 6M parameters coded in L bits yields a volume of $$V_{cp} = KN(\log\sqrt{2\pi e}\sigma_{cp} - \log \varepsilon) + 6MKL, \quad (20)$$

where $\varepsilon$ denotes the digitization interval of geophones. Then the compression ratio of the developed method by using entropy coding is $$CR_{cp} = \frac{V}{V_{cp}} \quad (21)$$

$$= \frac{L}{\log\sqrt{2\pi e}\, \sigma_{cp} - \log\varepsilon + \frac{6ML}{N}}.$$

Another way to deal with the representation residuals is quantization with fixed-length codewords, which results in a lossy compression. Suppose that each residual sample is coded as $l=\log_2 L_q$, where $L_q$ is the number of codewords. The compression ratio considering M components and $L_q$-level residual quantization is calculated as:

$$CR_{rq} = \frac{NL}{6ML + Nl}. \quad (22)$$

Although the residual quantization is expected to yield lower reconstruction quality, the compression ratio $CR_{rq}$ is higher than $CR_{cp}$ in (21).

In a non-limiting example, if the number of codewords is set as $L_q=128$, then each residual is quantized as $l=\log_2 L_q=7$ bits. Similarly, if the number of codewords is $L_q=256$, then each residual is quantized as 8 bits.

In a non-limiting example of scaling, for a length of the original seismic trace of N=4000, each of the samples is L=32 bits, requiring a storage space of NL=128000 bits per trace. If the trace is represented by M=10 models, and each residual sample is quantized with $L_q=128$ codewords, the storage space needed for the compressed trace is 6ML+Nl=29920 bits. The compression ratio is $$\frac{128000}{29920} = 4.27.$$

If the trace is represented by M=5 models, and each residual is quantized as $L_q=64$ codewords, the storage space needed for the compressed trace is 6ML+Nl=24960, thus the compression ratio is $$\frac{128000}{24960} = 5.13.$$

In the system, method and non-transitory computer readable medium, the computing system 460 further comprises a network controller connected to a transmitter 470 which transmits the stored encoded residual energy and the stored set of parameters to a remote processing station 380 for analysis and reconstruction as shown in FIG. 4.

The compression method of the present disclosure offers a flexible and robust compression-decompression scheme compared with the LPC. First, the method of the present disclosure can reconstruct the signal by only using estimates of the initial parameters. Although it may result in a lower reconstruction quality in some applications, it achieves a very high compression ratio and does not have any risk of reconstructing divergence. Secondly, the compression ratio and reconstruction quality can be scaled by adjusting the number of representation components and the level of quantization.

Figure 5A:
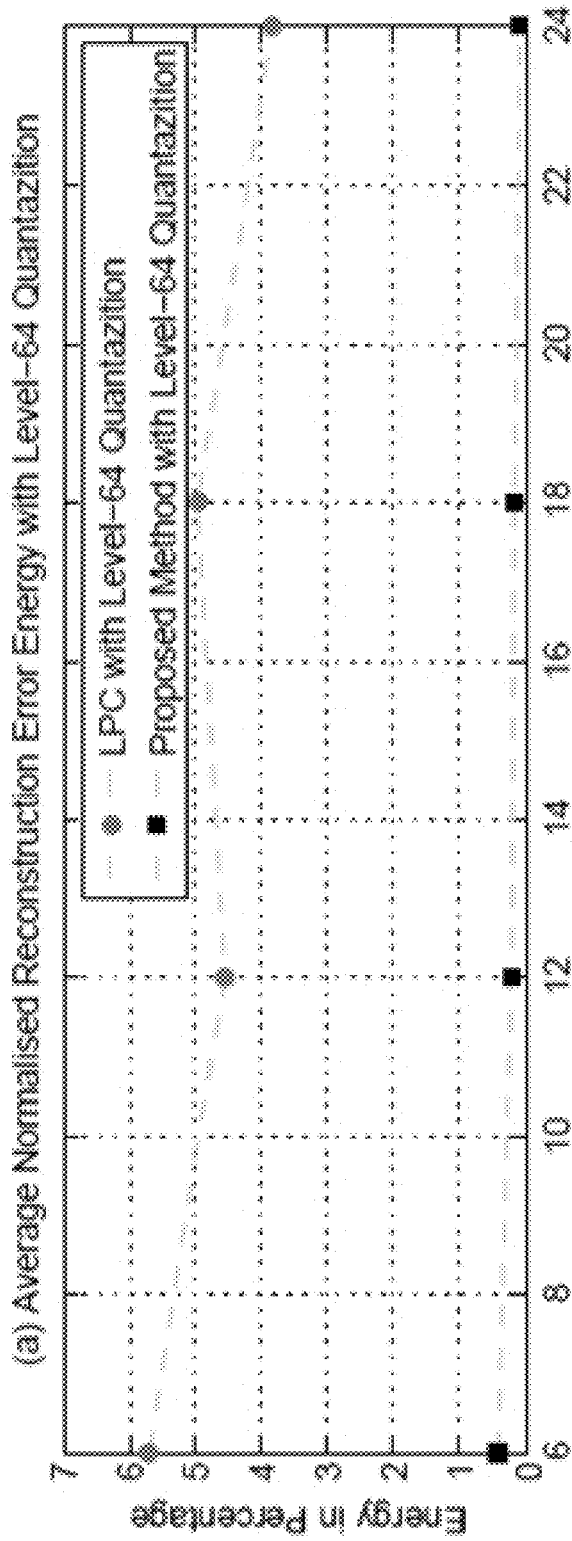
FIG. 5A illustrates a comparison of the reconstruction quality with residual quantization between a prior art LPC method and the method of the present disclosure showing the normalized reconstruction error with level-64 quantization.
Figure 5B:
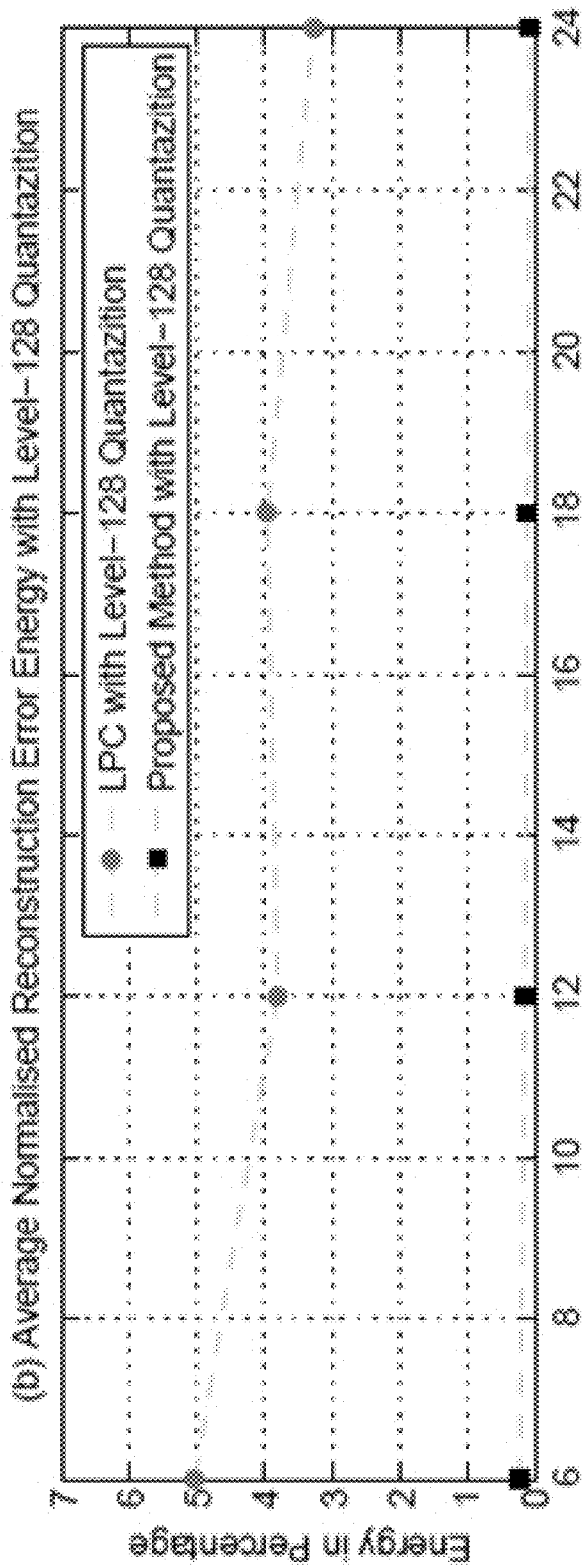
FIG. 5B illustrates a comparison of the reconstruction quality with residual quantization between a prior art LPC method and the method of the present disclosure showing the normalized reconstruction error with level-128 quantization.
Figure 5C:
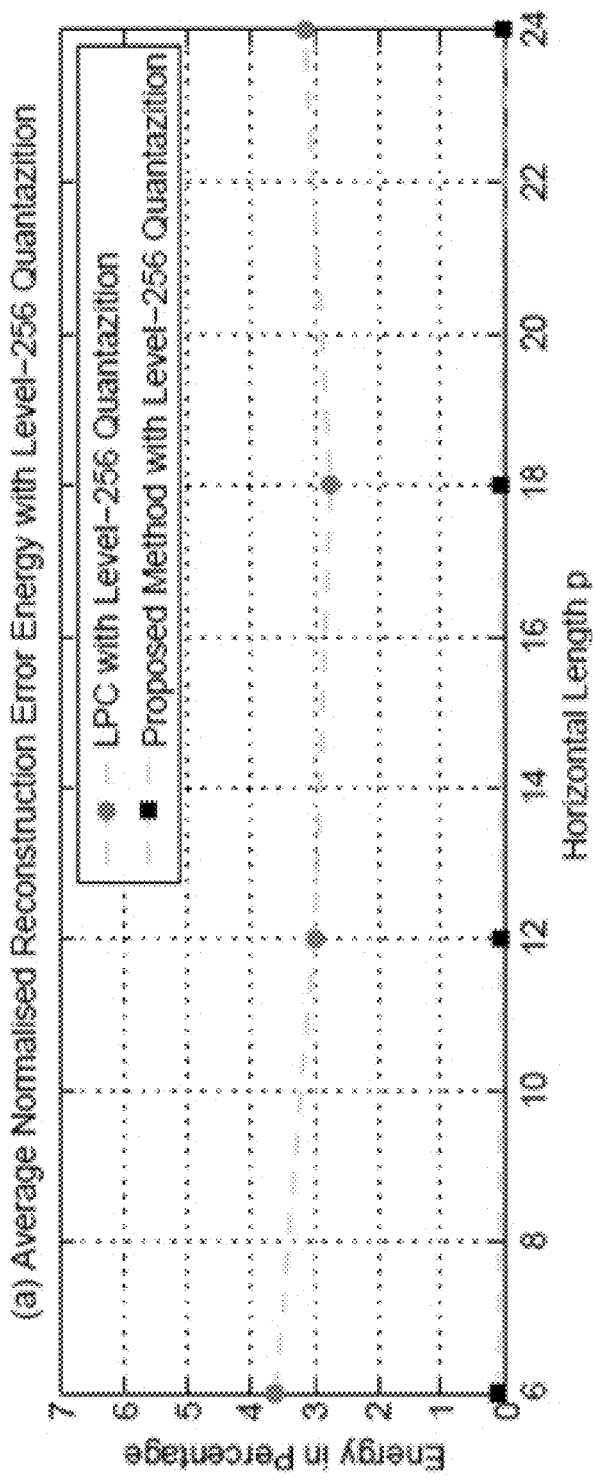
FIG. 5C illustrates a comparison of the reconstruction quality with residual quantization between a prior art LPC method and the method of the present disclosure showing the normalized reconstruction error with with level-256 quantization.

Furthermore, the compression method of the present disclosure is compared with the LPC method described in East Texas database. See W. A. Mousa and A. A. Al-Shuhail, "Processing of seismic reflection data using matlab," Synthesis Lectures on Signal Processing, vol. 5, no. 1, pp. 1-97, 2011, incorporated herein by reference in its entirety. This database contains 594 real traces, each of which has 1501 time samples with a sampling frequency 500 Hz. An LPC is designed with an estimate of horizontal length p=6, 12, 18, 24 to achieve almost same compression ratios of the proposed methods with M=2, 4, 6, 8. Three scalar quantizors, 64-level for 6 bits per sample, 128-level for 7 bits per sample and 256-level for 8 bits per sample, are designed using a k-means algorithm and then are used to compress the LPC residual $e'_L(k)$ as in (28) and the residual of the present invention. See K Sayood, Introduction to Data Compression, Third Edition. Elsevier, 2006, incorporated herein by reference in its entirety. The LPC with different values of p and different quantization levels is applied to the database, leading to around 20% reconstructed traces significantly diverging in all cases. The normalized reconstruction error energy, calculated from those converged traces, are plotted in FIGS. 5A, 5B, 5C for level-64, level-128 and level-256 quantization, respectively. Meanwhile, the corresponding results of the proposed method with same compression ratios are plotted in FIGS. 5A, 5B, 5C for comparison. Note that the LPC with p=6, 12, 18, 24 has almost same compression ratio as the proposed method with M=2, 4, 6, 8. Two facts are observed from this result. First, the reconstruction error of the LPC is not sensitive to changes in p, which implies that the performance of LPC is not easily scaled by choosing the value of p. Secondly, compared with performance of the present invention, the reconstruction quality of the converged traces by the LPC, is much lower with almost the same compression ratio.

In a non-limiting example, the methods and system of the present disclosure may be used by data collecting vehicles on a seismic acquisition field. Once the seismic data has been recorded in the vehicle, the data is compressed before being transmitted to another location for processing. This will greatly decrease either the requirement of the storage device capacity, or the frequency of transmission.

In a further non-limiting example, the methods and system of the present disclosure may be used with wireless geophones. The wireless geophones compress the traces received before sending them to a data center. This will greatly decrease the amount of data transmitted. Additionally, since wireless communication is energy consuming and the wireless geophones are powered with batteries, saving energy for wireless communication means increasing their working longevity.

Figure 7:
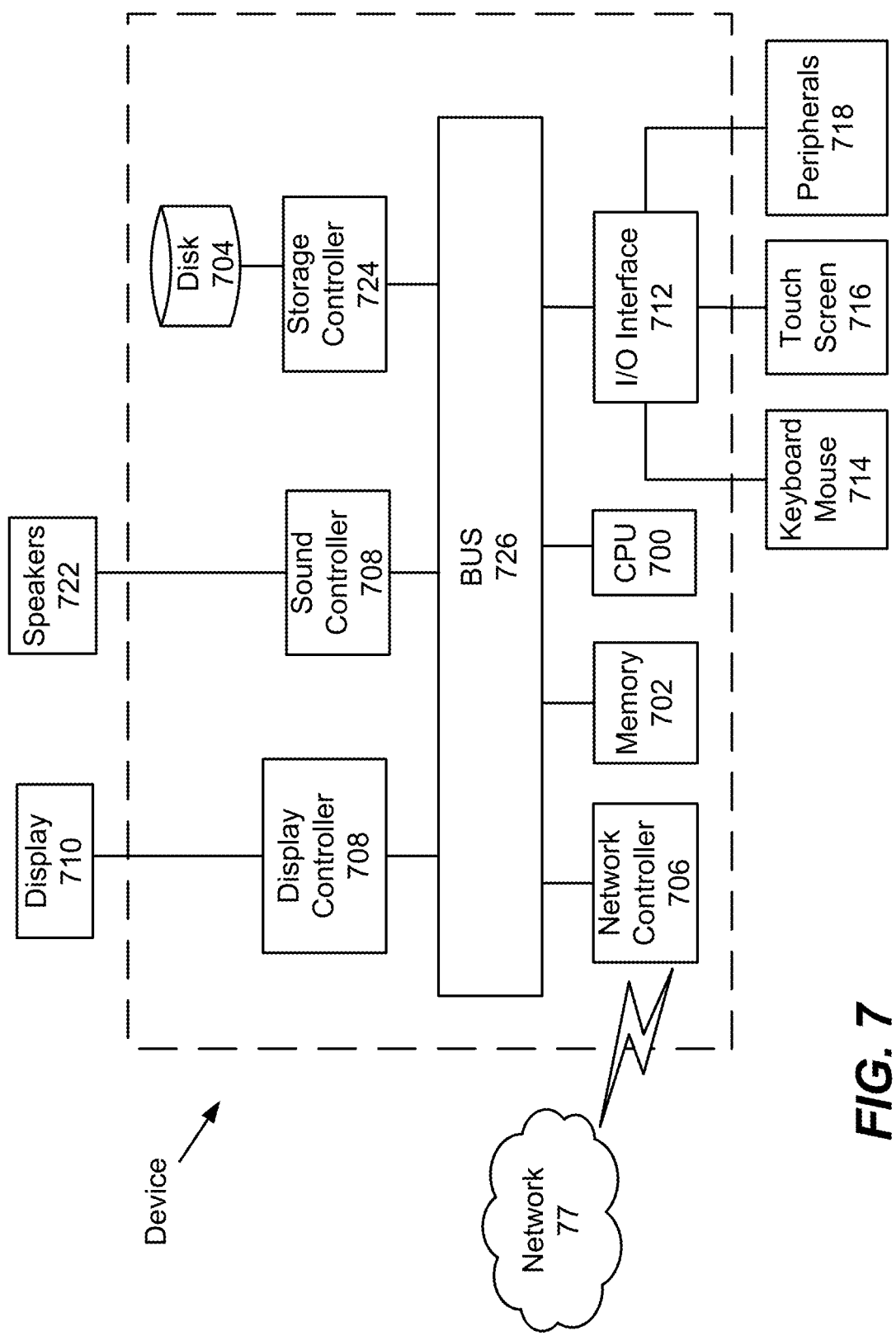
FIG. 7 shows hardware for the computing device used in the exemplary embodiments.

Next, a hardware description of the computing device according to exemplary embodiments is described with reference to FIG. 7. In FIG. 7, the computing device includes a CPU 700 which performs the processes described above/below. The process data and instructions may be stored in memory 702. These processes and instructions may also be stored on a storage medium disk 704 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the claimed advancements may be provided as a utility application, background daemon, or component of an operating system, or combination thereof, executing in conjunction with CPU 700 and an operating system such as Microsoft Windows 7, UNI7, Solaris, LINU7, Apple MAC-OS and other systems known to those skilled in the art.

The hardware elements in order to achieve the computing device may be realized by various circuitry elements, known to those skilled in the art. For example, CPU 700 may be a Xenon or Core processor from Intel of America or an Opteron processor from AMD of America, or may be other processor types that would be recognized by one of ordinary skill in the art. Alternatively, the CPU 700 may be implemented on an FPGA, ASIC, PLD or using discrete logic circuits, as one of ordinary skill in the art would recognize. Further, CPU 700 may be implemented as multiple processors cooperatively working in parallel to perform the instructions of the inventive processes described above.

The computing device in FIG. 7 also includes a network controller 706, such as an Intel Ethernet PRO network interface card from Intel Corporation of America, for interfacing with network 77. As can be appreciated, the network 77 can be a public network, such as the Internet, or a private network such as an LAN or WAN network, or any combination thereof and can also include PSTN or ISDN sub-networks. The network 77 can also be wired, such as an Ethernet network, or can be wireless such as a cellular network including EDGE, 3G and 4G wireless cellular systems. The wireless network can also be WiFi, Bluetooth, or any other wireless form of communication that is known.

The computing device further includes a display controller 708, such as a NVIDIA GeForce GT7 or Quadro graphics adaptor from NVIDIA Corporation of America for interfacing with display 710, such as a Hewlett Packard HPL2445w LCD monitor. A general purpose I/O interface 712 interfaces with a keyboard and/or mouse 714 as well as a touch screen panel 716 on or separate from display 710. General purpose I/O interface also connects to a variety of peripherals 718 including printers and scanners, such as an OfficeJet or DeskJet from Hewlett Packard.

A sound controller 720 is also provided in the computing device such as Sound Blaster 7-Fi Titanium from Creative, to interface with speakers/microphone 722 thereby providing sounds and/or music.

The general purpose storage controller 724 connects the storage medium disk 704 with communication bus 726, which may be an ISA, EISA, VESA, PCI, or similar, for interconnecting all of the components of the computing device. A description of the general features and functionality of the display 710, keyboard and/or mouse 714, as well as the display controller 708, storage controller 724, network controller 706, sound controller 720, and general purpose I/O interface 712 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 8.

Figure 8:
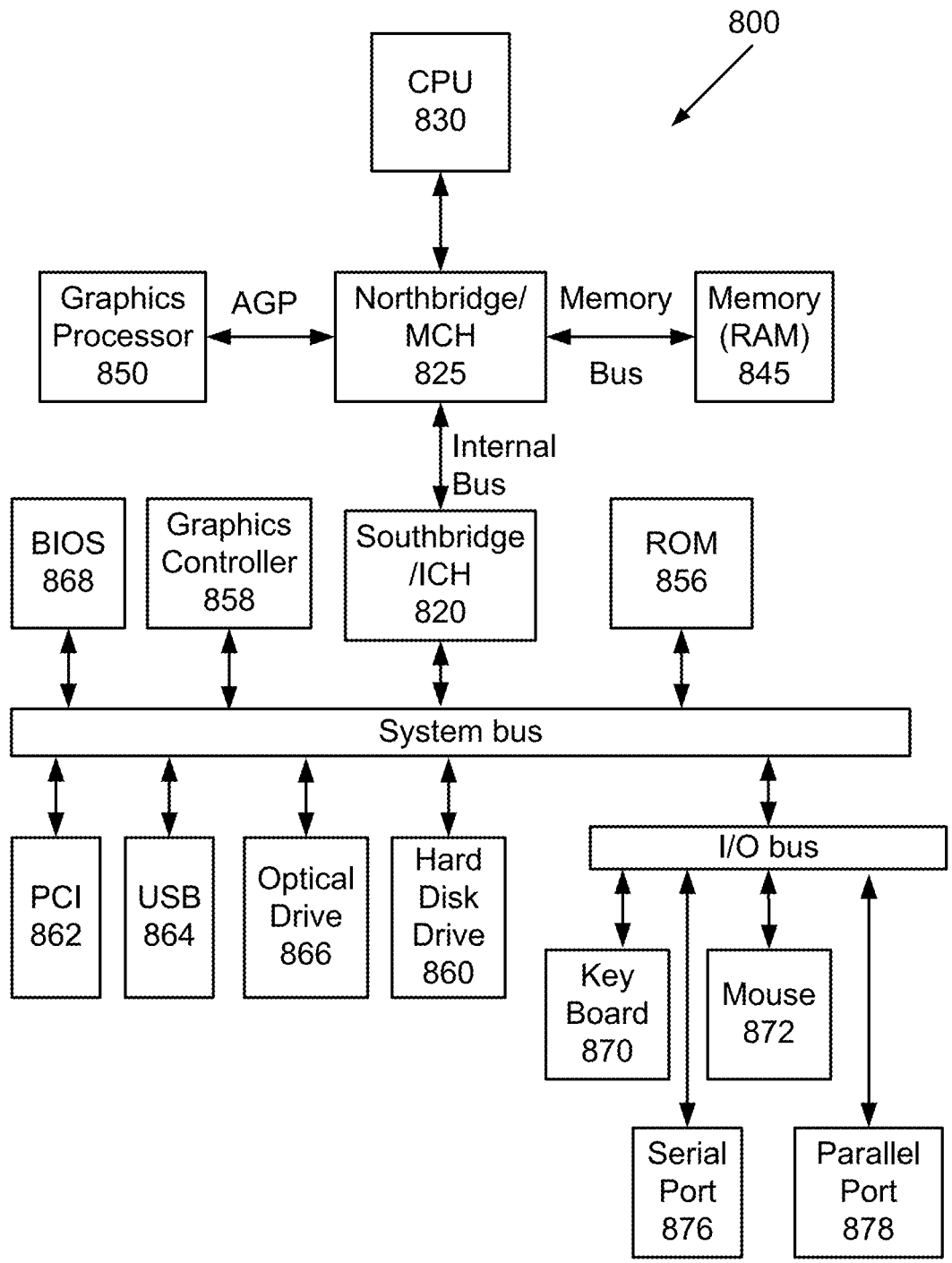
FIG. 8 shows circuitry configured to perform features of the invention.

FIG. 8 shows a schematic diagram of a data processing system, according to certain embodiments, for performing the functions of the exemplary embodiments. The data processing system is an example of a computer in which code or instructions implementing the processes of the illustrative embodiments may be located.

In FIG. 8, data processing system 800 employs a hub architecture including a north bridge and memory controller hub (NB/MCH) 825 and a south bridge and input/output (I/O) controller hub (SB/ICH) 820. The central processing unit (CPU) 830 is connected to NB/MCH 825. The NB/MCH 825 also connects to the memory 845 via a memory bus, and connects to the graphics processor 850 via an accelerated graphics port (AGP). The NB/MCH 825 also connects to the SB/ICH 820 via an internal bus (e.g., a unified media interface or a direct media interface). The CPU Processing unit 830 may contain one or more processors and even may be implemented using one or more heterogeneous processor systems.

Figure 9:
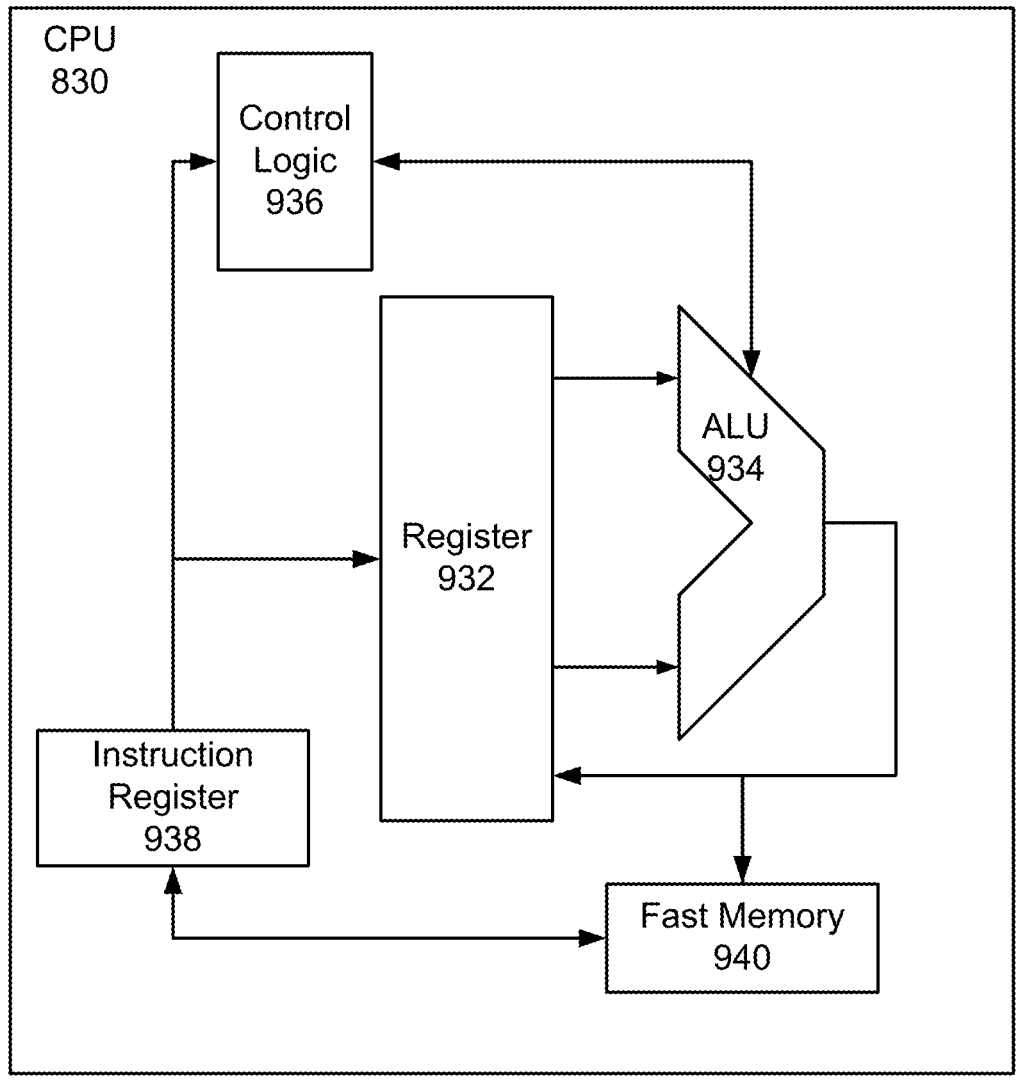
FIG. 9 shows a data processing system hub used in the exemplary embodiments.

For example, FIG. 9 shows one implementation of CPU 830. In one implementation, the instruction register 938 retrieves instructions from the fast memory 940. At least part of these instructions are fetched from the instruction register 938 by the control logic 936 and interpreted according to the instruction set architecture of the CPU 830. Part of the instructions can also be directed to the register 932. In one implementation the instructions are decoded according to a hardwired method, and in another implementation the instructions are decoded according a microprogram that translates instructions into sets of CPU configuration signals that are applied sequentially over multiple clock pulses. After fetching and decoding the instructions, the instructions are executed using the arithmetic logic unit (ALU) 934 that loads values from the register 932 and performs logical and mathematical operations on the loaded values according to the instructions. The results from these operations can be feedback into the register and/or stored in the fast memory 940. According to certain implementations, the instruction set architecture of the CPU 830 can use a reduced instruction set architecture, a complex instruction set architecture, a vector processor architecture, a very large instruction word architecture. Furthermore, the CPU 830 can be based on the Von Neuman model or the Harvard model. The CPU 830 can be a digital signal processor, an FPGA, an ASIC, a PLA, a PLD, or a CPLD. Further, the CPU 830 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 8, the data processing system 800 can include that the SB/ICH 820 is coupled through a system bus to an I/O Bus, a read only memory (ROM) 856, universal serial bus (USB) port 864, a flash binary input/output system (BIOS) 868, and a graphics controller 858. PCI/PCIe devices can also be coupled to SB/ICH 888 through a PCI bus 862.

The PCI devices may include, for example, Ethernet adapters, add-in cards, and PC cards for notebook computers. The Hard disk drive 860 and CD-ROM 866 can use, for example, an integrated drive electronics (IDE) or serial advanced technology attachment (SATA) interface. In one implementation the I/O bus can include a super I/O (SIO) device.

Further, the hard disk drive (HDD) 860 and optical drive 866 can also be coupled to the SB/ICH 820 through a system bus. In one implementation, a keyboard 870, a mouse 872, a parallel port 878, and a serial port 876 can be connected to the system bus through the I/O bus. Other peripherals and devices that can be connected to the SB/ICH 820 using a mass storage controller such as SATA or PATA, an Ethernet port, an ISA bus, a LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry, or based on the requirements of the intended back-up load to be powered.

Figure 6:
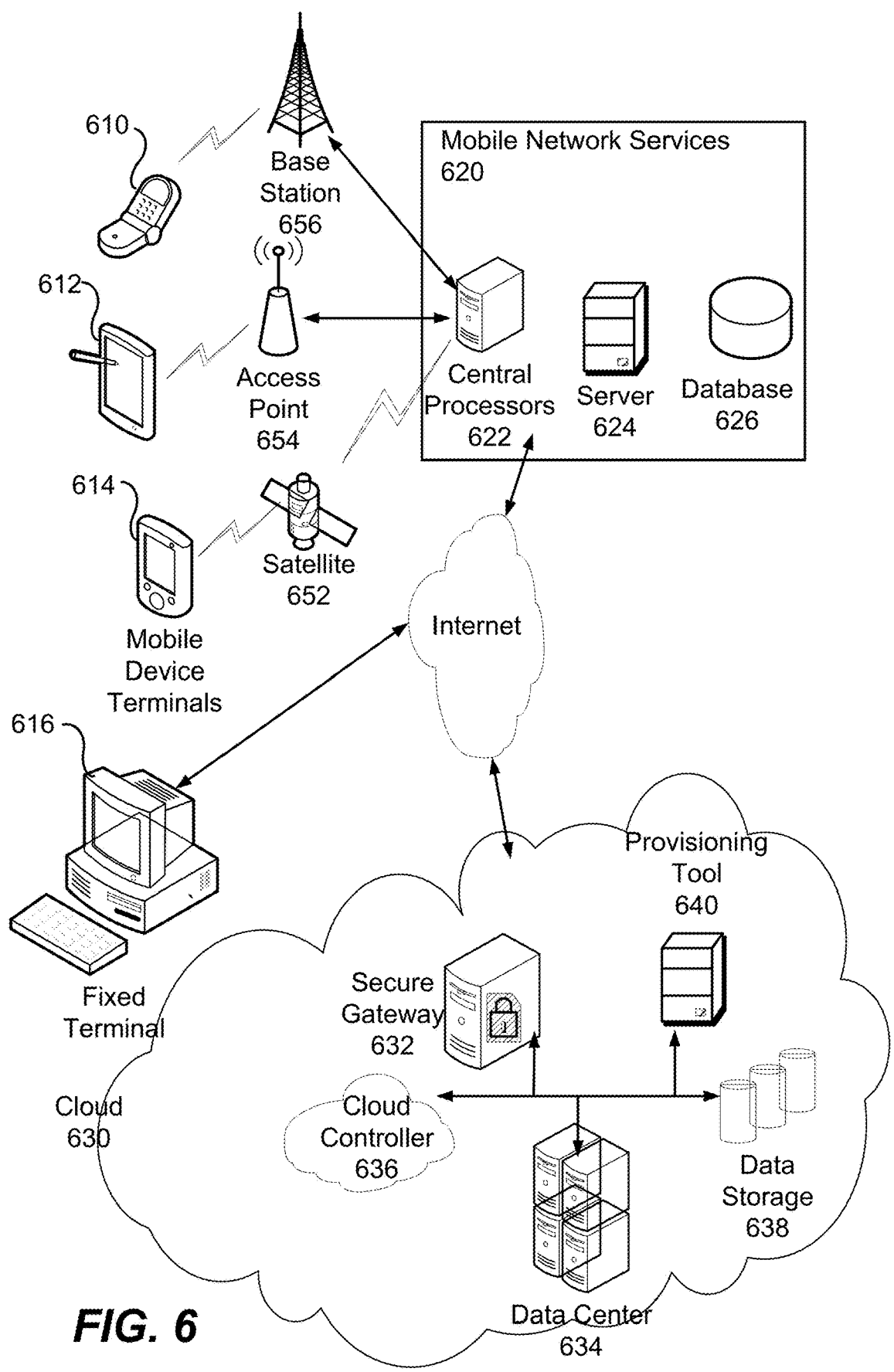
FIG. 6 shows distributed components including one or more client and server machines, which may share processing.

The functions and features described herein may also be executed by various distributed components of a system. For example, one or more processors may execute these system functions, wherein the processors are distributed across multiple components communicating in a network. The distributed components may include one or more client and server machines, which may share processing, as shown on FIG. 6, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

The above-described hardware description is a non-limiting example of corresponding structure for performing the functionality described herein.

Obviously, numerous modifications and variations of the present invention are possible in light of the above teachings. It is therefore to be understood that within the scope of the appended claims, the invention may be practiced otherwise than as specifically described herein.

The invention claimed is:

1. A seismic surveying system, comprising:
   at least one seismic generator for emitting seismic shots into a geological formation;
   at least one seismic receiver for receiving waves reflected from discontinuities within the geological formation;
   a computer interface coupled to the at least one seismic receiver for receiving the reflected waves, wherein the computer interface separates the received reflected waves into seismic traces, each seismic trace representing a number (N) of samples collected over a time period;
   a computing system adapted to receive the seismic traces from the computer interface, wherein the computing system comprises a processor with circuitry configured to
      represent the at least one trace by determining a set of decaying sinusoids ($s_k$) which when superimposed represent the seismic trace ($x(k)$) to within a residual energy criterion,
      wherein each of the decaying sinusoids is characterized by a set of parameters including a starting time parameter ($k_i$), a damping factor parameter ($h_i$), a frequency parameter ($\omega_i$), at least one amplitude parameter ($A_i$, $B_i$) and a constant shift parameter ($C_i$); and
   a memory module for storing the set of parameters.

2. The system of claim 1,
   wherein the seismic generator is at least one of a vibrator on a vibrator truck, an explosive device, an air gun, a water gun and a vapor gun,
   and wherein the seismic receiver is at least one of a geophone, a hydrophone, a seismometer, a microphone, a particle velocity sensor, a water pressure sensor, a particle displacement sensor, a particle acceleration sensor and a pressure gradient sensor.

3. The system of claim 1, wherein the circuitry is further configured to:
   reconstruct the seismic trace from the set of stored parameters;
   determine a residual between the seismic trace and the reconstructed seismic trace;
   determine whether the residual meets a residual energy criterion;
   based upon the set of stored parameters, determine a new set of parameters that characterize a new set of decaying sinusoids;
   reconstruct the seismic trace from the new set of parameters;
   determine a new residual between the seismic trace and the reconstructed seismic trace from the new set of parameters;
   determine whether the new residual meets a pre-defined residual energy criterion;
   reiterate the determining of the residual and the determining of a set of parameters based upon the previously determined set of parameters until the residual meets the pre-defined residual energy criterion; and
   store the sets of parameters with the residual which meets pre-defined residual energy criterion.

4. The system of claim 3, wherein the circuitry further comprises
   a compression module,
   wherein the compression module compresses the residual that meets the pre-defined residual energy criterion using entropy coding or quantization coding; and
   stores the encoded residual with the sets of parameters.

5. The system of claim 4, wherein the circuitry further comprises
   a transmitter which transmits the stored encoded residual energy and the stored set of parameters to a remote processing station.

6. The system of claim 3, wherein the circuitry is further configured to determine the set of parameters using a single tone representation of the seismic trace; and
determine the new set of parameters using a single tone representation of the residual at each iteration.

7. The system of claim 1, wherein the seismic trace (x(k)) is represented as $$x(k) = \sum_{i=1}^{M} s_{\theta_i}(k) + v(k), k = 1, 2, \ldots, N$$

where v(k) denotes the unrepresented signal, and $s_{\theta_i}(k)$ are exponentially decaying sinusoidal waves defined as $$s_{\theta_i}(k) = \begin{cases} e^{-h_i(k-k_i)T} \alpha_i \sin(\omega_i(k-k_i)T + \phi_i) + C_i & k \geq k_i \\ 0 & k < k_i \end{cases}$$

where T is the sampling time of the seismic trace and $h_i$, $k_i$, $\alpha_i$, $\omega_i$, $\phi_i$ and $C_i$ are representative of the damping factor, starting time, initial amplitude, frequency, phase shift and constant shift, respectively.

8. The system of claim 7,
wherein the decaying sinusoidal waves $s_{\theta_i}(k)$ are recast, for $k \geq k_i$, into the form $$s_{\theta_i}(k) = e^{-h_i(k-k_i)T} A_i \cos \omega_i(k-k_i)T + e^{-h_i(k-k_i)T} B_i \sin \omega_i(k-k_i)T + C_i$$

where $A_i = \alpha_i \sin \phi_i$ and $B_i = \alpha_i \cos \phi_i$; and
wherein the parameter set for each sinusoidal wave is defined as $\theta_i = \{k_i, \pi_i\}$ and $\pi_i = \{A_i, B_i, C_i, \omega_i, h_i\}$.

9. The system of claim 8,
wherein the residual is defined as:

$$r_{\theta_i^*}(k) = x(k) - \sum_{j=1}^{i} s_{\theta_j^*}(k)$$

and, either the residual energy criterion is defined as the residual energy is lower than a predefined threshold ($r_E$), $$r_{\theta_i^*}^{*2} < r_E,$$

wherein the iteration is terminated when the residual energy is lower than the predefined threshold,
or the residual energy dropping rate is lower than a predefined threshold, ($r_D$), $$\frac{r_{\theta_{j-1}^*}^2 - r_{\theta_j^*}^2}{r_{\theta_{j-1}^*}^2} 100\% < r_D$$

wherein the iteration is terminated when the residual energy dropping rate is lower than the predefined threshold.

10. A method for seismic surveying comprising:
emitting, using at least one seismic generator, seismic shot waves into a geological formation;
receiving, using at least one seismic receiver, waves reflected from discontinuities within the geological formation;
receiving, at a computer interface coupled to the at least one seismic receiver, the reflected waves,
the computer interface separating the received reflected waves into seismic traces, each seismic trace representing a number (N) of samples collected over a time period;
receiving, by a computing system, the seismic traces from the computer interface,
wherein the computing system comprises a processor with circuitry configured for representing the at least one trace by determining a set of decaying sinusoids ($s_k$), which when superimposed, represent the seismic trace (x(k) to within a residual energy criterion,
wherein each of the decaying sinusoids is characterized by a set of parameters including a starting time parameter ($k_i$), a damping factor parameter ($h_i$), a frequency parameter ($\omega_i$), at least one amplitude parameter ($A_i$, $B_i$) and a constant shift parameter ($C_i$); and
storing the set of parameters in a memory module.

11. The method of claim 10, further comprising:
wherein emitting the seismic shot using at least one generator is selected from a list comprising a vibrator on a vibrator truck, an explosive device, an air gun, a water gun, a vapor gun, an electric spark, an electric arc, a marine vibrator; and
wherein the at least one seismic receiver is selected from a list comprising a geophone, a hydrophone, a seismometer, a microphone, a particle velocity sensor, a water pressure sensor, a particle displacement sensor, a particle acceleration sensor and a pressure gradient sensor.

12. The method of claim 10, wherein the circuitry is further configured for:
reconstructing the seismic trace from the set of stored parameters;
determining a residual between the seismic trace and the reconstructed seismic trace;
determining whether the residual meets a residual energy criterion;
determining a new set of parameters based upon the set of stored parameters, wherein the new set of parameters characterize a new set of decaying sinusoids;
reconstructing the seismic trace from the new set of parameters;
determining a new residual between the seismic trace and the reconstructed seismic trace from the new set of parameters;
determining whether the new residual meets a pre-defined residual energy criterion;
reiterating the determining of the residual and the determining of a set of parameters based upon the previously determined set of parameters until the residual meets the pre-defined residual energy criterion; and
storing the sets of parameters determined at each iteration with the residual which meets pre-defined residual energy criterion.

13. The method of claim 12, the circuitry further comprising:
a compression module adapted for compressing the residual that meets the pre-defined residual energy criterion using entropy coding or quantization coding; and
storing the encoded residual with the sets of parameters.

14. The method of claim 13, the circuitry further comprising:
a transmitter for transmitting the stored encoded residual energy and the stored set of parameters to a remote processing station.

15. The method of claim 12, further configuring the circuitry for:
determining the set of parameters using a single tone representation of the seismic trace; and
determining the new set of parameters using a single tone representation of the residual at each iteration.

16. The method of claim 10, wherein the circuitry is further configured for:
representing the seismic trace (x(k)) as $$x(k) = \sum_{i=1}^{M} s_{\theta_i}(k) + v(k), k = 1, 2, \ldots, N$$

where v(k) denotes the unmodeled signal, and $s_{\theta_i}(k)$ are exponentially decaying sinusoidal waves defined as $$s_{\theta_i}(k) = \begin{cases} e^{-h_i(k-k_i)T} \alpha_i \sin(\omega_i(k-k_i)T + \phi_i) + C_i & k \geq k_i \\ 0 & k < k_i \end{cases}$$

where T is the sampling time of the seismic trace and $h_i$, $k_i$, $\alpha_i$, $\omega_i$, $\phi_i$ and $C_i$ are representative of the damping factor, starting time, initial amplitude, frequency, phase shift and constant shift, respectively.

17. The method of claim 16, wherein the circuitry is further adapted for:
recasting the decaying sinusoidal waves $s_{\theta_i}(k)$, for $k \geq k_i$, into the form:

$$s_{\theta_i}(k) = e^{-h_i(k-k_i)T} A_i \cos \omega_i(k-k_i)T + e^{-h_i(k-k_i)T} B_i \sin \omega_i(k-k_i)T + C_i$$

where $A_i = \alpha_i \sin \phi_i$ and $B_i = \alpha_i \cos \phi_i$; and
defining the parameter set for each sinusoidal wave as $\theta_i = \{k_i, \pi_i\}$ and $\pi_i = \{A_i, B_i, C_i, \omega_i, h_i\}$.

18. The system of claim 17, wherein the circuitry is further adapted for:
defining the residual as:

$$r_{\theta_i^*}(k) = x(k) - \sum_{j=1}^{i} s_{\theta_j^*}(k)$$

and defining the residual energy criterion either as
the residual energy is lower than a predefined threshold ($r_E$), $$r_{\theta_j^*}^{*2} < r_E,$$

and terminating the iterating when the residual energy is lower than the predefined threshold,
the residual energy dropping rate is lower than a predefined threshold, ($r_D$), $$\frac{r_{\theta_{j-1}^*}^2 - r_{\theta_j^*}^2}{r_{\theta_{j-1}^*}^2} 100\% < r_D$$

and terminating the iterating when the residual energy dropping rate is lower than the predefined threshold.

19. A non-transitory computer readable medium having instructions stored therein that, when executed by one or more processor, cause the one or more processors to perform a method of seismic surveying, the method comprising:
emitting, using at least one seismic generator, seismic shot waves into a geological formation;
receiving, using at least one seismic receiver, waves reflected from discontinuities within the geological formation;
receiving, at a computer interface coupled to the at least one seismic receiver, the reflected waves,
the computer interface separating the received reflected waves into seismic traces, each seismic trace representing a number (N) of samples collected over a time period;
receiving, by a computing system, the seismic traces from the computer interface,
wherein the computing system comprises a processor with circuitry configured for representing the at least one trace by determining a set of decaying sinusoids ($s_k$), which when superimposed, represent the seismic trace (x(k) to within a residual energy criterion,
wherein each of the decaying sinusoids is characterized by a set of parameters including a starting time parameter ($k_i$), a damping factor parameter ($h_i$), a frequency parameter ($\omega_i$), at least one amplitude parameter ($A_i$, $B_i$) and a constant shift parameter ($C_i$);
reconstructing the seismic trace from the set of parameters;
determining a residual between the seismic trace and the reconstructed seismic trace;
determining whether the residual meets a residual energy criterion;
determining a new set of parameters based upon the set of parameters, wherein the new set of parameters characterize a new set of decaying sinusoids;
reconstructing the seismic trace from the new set of parameters;
determining a new residual between the seismic trace and the reconstructed seismic trace from the new set of parameters;
determining whether the new residual meets a pre-defined residual energy criterion;
reiterating the determining of the residual and the determining of a set of parameters based upon the previously determined set of parameters until the residual meets the pre- defined residual energy criterion;
storing the sets of parameters determined at each iteration with the residual which meets pre-defined residual energy criterion;
the circuitry further comprising a compression module,
compressing, using the compression module, the residual that meets the pre-defined residual energy criterion using entropy coding or quantization coding;
reconstructing the seismic trace from the new set of parameters;
determining a new residual between the seismic trace and the reconstructed seismic trace from the new set of parameters;
determining whether the new residual meets a pre-defined residual energy criterion;
reiterating the determining of the residual and the determining of a set of parameters based upon the previously determined set of parameters until the residual meets the pre-defined residual energy criterion;
compressing, using a compression module, the residual that meets the pre-defined residual energy criterion using entropy coding or quantization coding; and
storing the encoded residual with the sets of parameters; and transmitting the stored encoded residual energy and the stored set of parameters to a remote processing station.

20. The non-transitory computer readable medium of claim 19, further comprising modelling the seismic trace (x(k)) as $$x(k) = \sum_{i=1}^{M} s_{\theta_i}(k) + v(k), k = 1, 2, \ldots, N$$

where v(k) denotes the unmodeled signal, and $s_{\theta_i}(k)$ are exponentially decaying sinusoidal waves defined as $$s_{\theta_i}(k) = \begin{cases} e^{-h_i(k-k_i)T} \alpha_i \sin(\omega_i(k-k_i)T + \phi_i) + C_i & k \geq k_i \\ 0 & k < k_i \end{cases}$$

where T is the sampling time of the seismic trace and $h_i$, $k_i$, $\alpha_i$, $\omega_i$, $\theta_i$ and $C_i$ are the damping factor, starting time, initial amplitude, frequency, phase shift and constant shift, respectively; and recasting the decaying sinusoidal waves $s_{\theta_i}(k)$, for $k \geq k_i$, into the form:

$$s_{\theta_i}(k) = e^{-h_i(k-k_i)T} A_i \cos \omega_i(k-k_i)T + e^{-h_i(k-k_i)T} B_i \sin \omega_i(k-k_i)T + C_i$$

where $A_i = \alpha_i \sin \phi_i$ and $B_i = \alpha_i \cos \phi_i$; and defining the parameter set for each sinusoidal wave as $\theta_i = \{k_i, \pi_i\}$ and $\pi_i = \{A_i, B_i, C_i, \omega_i, h_i\}$.

* * * * *